(12) United States Patent
Mossman (10) Patent No.: US 7,240,471 B2
(45) Date of Patent: Jul. 10, 2007

(54) ROW DIVIDER HAVING A VARIABLE-HEIGHT EAR SAVER

(75) Inventor: Michael Wayne Mossman, Silvis, IL (US)

(73) Assignee: Deere & Company, Moline, IL (US)

( * ) Notice: Subject to any disclaimer, the term of this patent is extended or adjusted under 35 U.S.C. 154(b) by 191 days.

(21) Appl. No.: 11/053,496

(22) Filed: Feb. 8, 2005

(65) Prior Publication Data

US 2006/0174603 A1    Aug. 10, 2006

(51) Int. Cl.
*A01D 45/02* (2006.01)
(52) U.S. Cl. .............................. 56/119; 56/109; 56/314
(58) Field of Classification Search ................ 56/14.3, 56/94, 109, 119, 126, 219, 314
See application file for complete search history.

(56) References Cited

U.S. PATENT DOCUMENTS

| | | | |
|---|---|---|---|
| 2,751,744 A | 6/1956 | Reade et al. ................... 56/119 |
| 3,214,894 A * | 11/1965 | Whitman ....................... 56/119 |
| 4,037,393 A | 7/1977 | Anderson ...................... 56/119 |
| 4,300,335 A | 11/1981 | Anderson ...................... 56/119 |
| 4,493,181 A * | 1/1985 | Glendenning et al. ......... 56/314 |
| 5,195,309 A * | 3/1993 | Mossman ...................... 56/119 |
| 5,787,697 A | 8/1998 | Post ............................. 56/119 |
| 5,865,019 A | 2/1999 | Hurlburt et al. ............... 56/119 |
| 5,910,092 A * | 6/1999 | Bennett ........................ 56/119 |
| 6,143,230 A * | 11/2000 | Andrios et al. ............. 264/306 |
| 6,247,297 B1* | 6/2001 | Becker ......................... 56/119 |
| 6,513,313 B1* | 2/2003 | Bennett ........................ 56/319 |
| 2003/0226342 A1 | 12/2003 | Boeckmann et al. ......... 56/14.7 |

FOREIGN PATENT DOCUMENTS

EP    1 186 223    6/2001

* cited by examiner

*Primary Examiner*—Thomas B. Will
*Assistant Examiner*—Jamie L. McGowan (57) ABSTRACT

For a row crop header, a row divider having a variable-height ear saver feature. The row divider comprises a point, a cover, and a partition. The point has a trailing edge vertically moveable relative to the cover. The partition fills a resultant gap between the point and the cover, forming a variable-height ear saver feature. A crankshaft functions to articulate the trailing edge relative to the cover, and to move the partition vertically with the trailing edge. A support functions to support the point at a midpoint. A guide constrains the partition within the gap.

12 Claims, 7 Drawing Sheets

ROW DIVIDER HAVING A VARIABLE-HEIGHT EAR SAVER

FIELD OF THE INVENTION

This invention related to agricultural combine headers, and more specifically, to a header row divider having a variable-height ear savers.

BACKGROUND OF THE INVENTION

An agricultural combine is a large machine used to harvest a variety of crops from a field. During a harvesting operation, a header at the front of the combine cuts ripened crop from the field. A feederhouse supporting the header transfers the crop material into the combine. Threshing and separating assemblies within the combine remove grain from the crop material and transfer the clean grain to a grain tank for temporary holding. Crop material other than grain exits from the rear of the combine. An unloading auger transfers the clean grain from the grain tank to a truck or grain cart for transport, or to another receiving bin for holding.

Row crop and corn headers are header types commonly used when harvesting crops planted in rows such as soybeans and corn. These header types have row dividers that extend forward from the header to divide crop rows and guide crop material into header row units that cut the crop. When harvesting corn with a corn header, the row dividers may be equipped with a feature called an ear saver to prevent corn ears from falling over the front the header during the harvesting operation. Traditionally, the ear saver was either a removal component attaching the row divider, or a permanent, non-removable design feature of the row unit.

In standing corn, it is desirable to have a relatively tall ear saver to substantially prevent corn ears from falling overboard while harvesting. However, in down corn conditions, a relatively tall ear saver creates a slope on the row divider that is too steep for the crop to easily slide over and into the row units. For an ear saver that is a permanent, non-removable design feature of the row divider, maximizing ear saver height for one condition compromises ear saver performance for the other condition. Alternatively, removable ear savers often get lost, may come off in the machine and cause damage, and are time consuming to install and remove with changing crop conditions.

SUMMARY OF THE INVENTION

This invention allows for variable ear saver height without removing or installing separate components to the row divider. The ear saver in this invention is a resulting feature of the relative height difference between the row divider point and the row divider cover. The row divider point in this invention is vertically moveable relative to the row cover. Thus, moving the point up or down relative to the cover varies the height of the ear saver. In standing corn conditions, the point is set at a normal working position, resulting in a maximum ear saver height. In down corn conditions, where it is desirable to provide minimum resistance to crop material sliding over the row divider, the point is set at a lowered working position, resulting in a minimum ear saver height.

DETAILED DESCRIPTION

Figure 1:
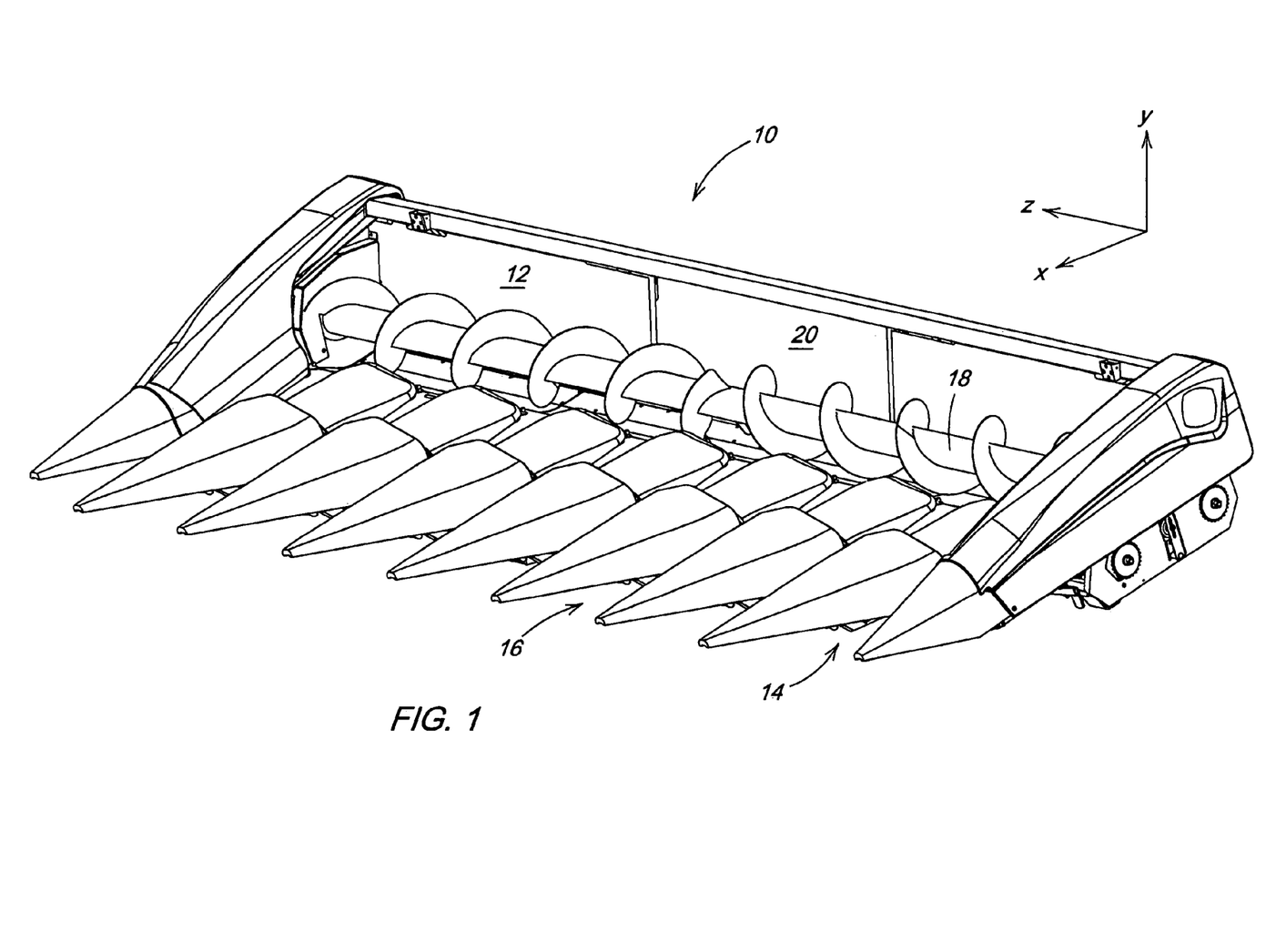
FIG. 1 is a perspective view of a row crop header.

FIG. 1 shows a perspective view of a corn header with reference to coordinate axes X, Y, and Z. In this following detailed description, the X-axis defines horizontal longitudinal, with the positive X direction defining forward. The Y-axis defines vertical, with the positive Y direction defining up. The Z-axis defines horizontal lateral, with the positive Z direction defining right.

The corn header 10 in the illustrated embodiment is comprised of a frame 12, several row units 14 distributed along the frame 12, a row divider 16 positioned between each row unit 14, a conveying auger 18 behind the row units 14, and an opening 20 at the center of the header 10 leading into the combine. Referring to FIG. 1, the frame 12 extends laterally across the entire width of the header 10 and functions to support the header structure. The row units 14 extend longitudinally forward from the frame 12 and function to cut and gather standing rows of corn. The row dividers 16 mount above the row units 14 and function to divide and guide the standing rows toward the cutting and gathering portions 22 on the row units 14. The conveying auger 18 extends laterally across the width of the header 10 and functions to convey cut corn crop to the header opening 20 and into the combine.

Figure 2:
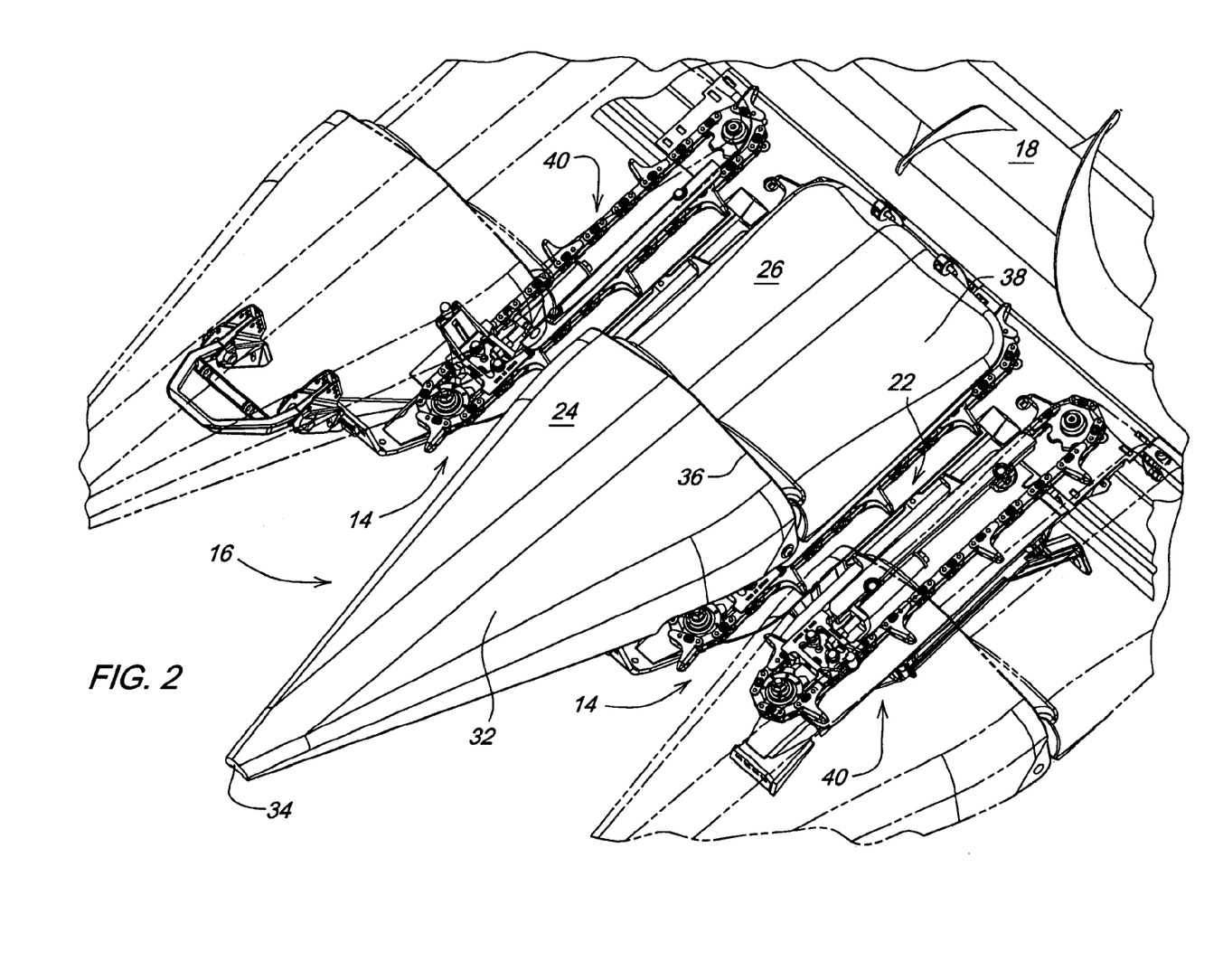
FIG. 2 is a detailed perspective view showing a row divider of the header.
Figure 6:
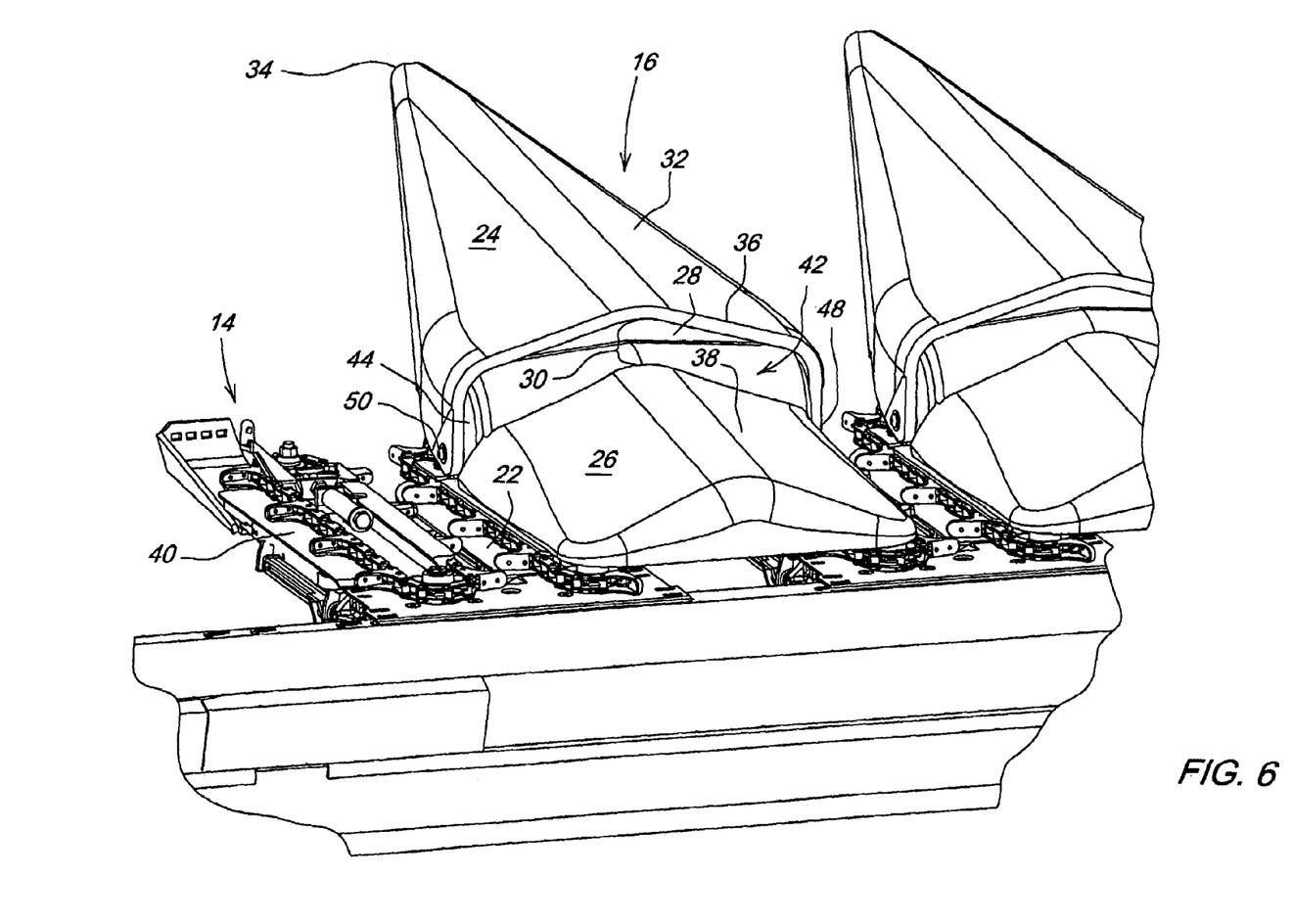
FIG. 6 is a perspective view showing the partition of the row divider with the front portion in the lowered working position.
Figure 7:
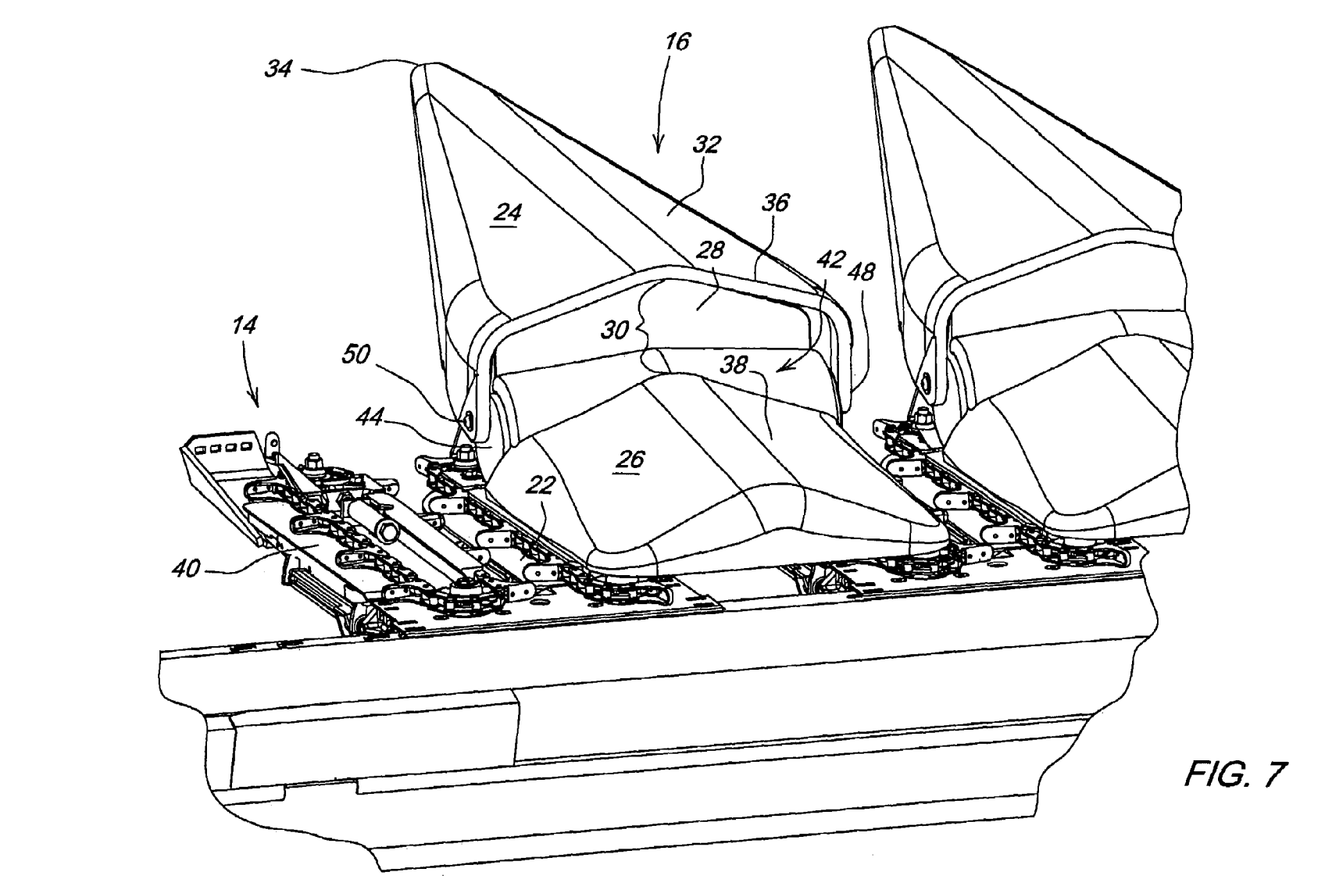
FIG. 7 is a perspective view showing the partition of the row divider with the front portion in the normal working position.

The row divider 16 in the illustrated embodiment is comprised of a front portion called a point 24, a rear portion called a cover 26, and a partition 28 filling a resultant vertical and lateral gap 30 between the point 24 and the cover 26. Referring to FIG. 2, the point 24 is a component having a tapered surface 32 longitudinally sweeping rearward from a forward location 34 to an upwardly arching trailing edge 36. The point 24 serves the primary function of the row divider 16 of dividing and guiding the standing corn rows toward the row units 14. The cover 26 is a component having a surface 38 longitudinally sweeping rearward from beneath the trailing edge 36 of the point 24. The cover 26 functions to shield the cut crop material from moving parts 40 of row unit 14 as the crop passes toward the combine. Referring to FIGS. 6 and 7, the region between the surface 38 of the cover 26 and the trailing edge 36 of the point 24 defines the resultant vertical and lateral gap 30. With the partition 28 present, this feature becomes an ear saver 42, functioning to prevent corn ears from falling over the front of the header 10 during a harvesting operation.

Figure 3:
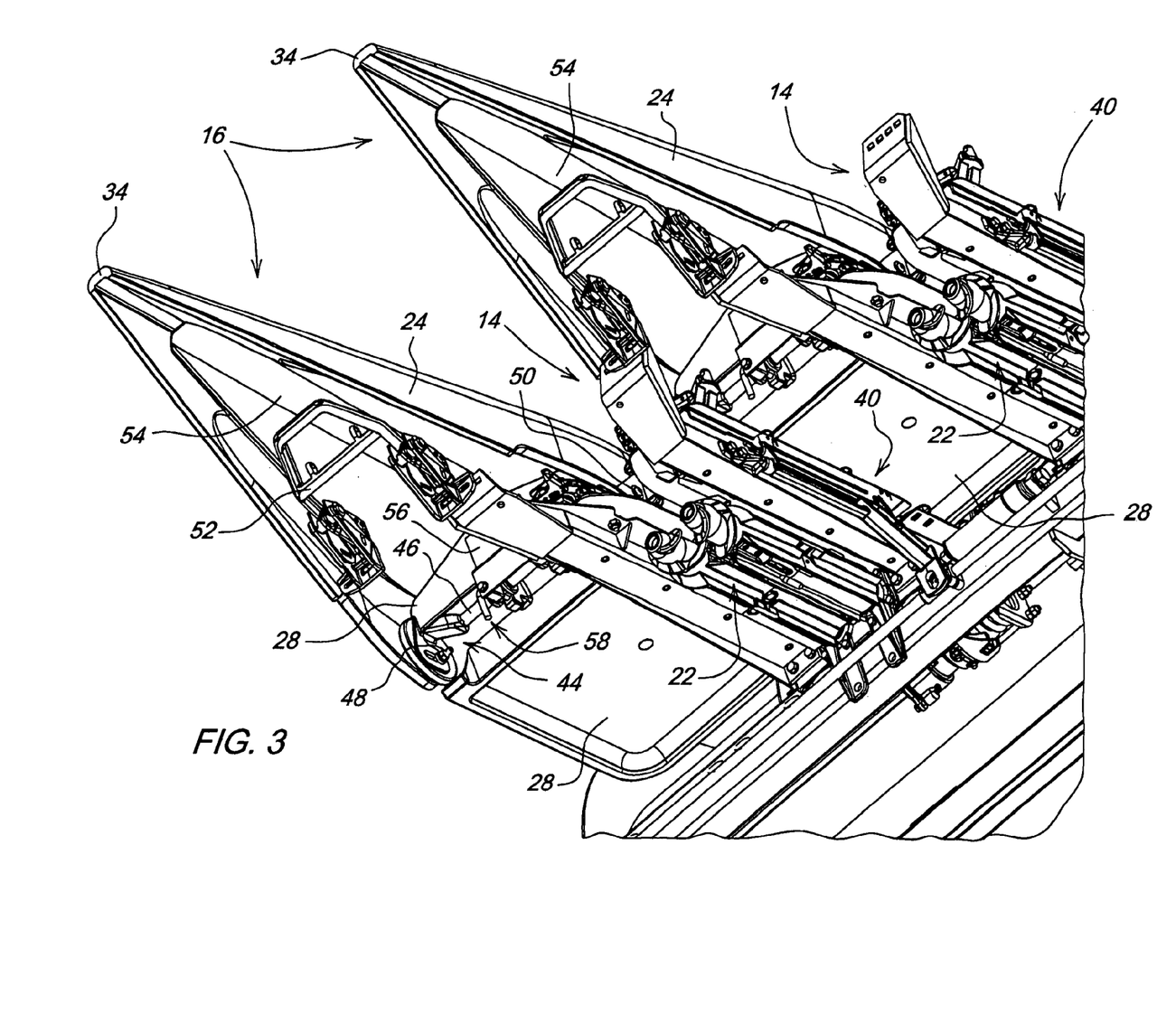
FIG. 3 is a detailed perspective view for the bottom of two row dividers.

A crankshaft 44, comprising a shaft 46 and offset crankpins 48, 50, at either end, laterally extends across the width of the point 24 proximate the trailing edge 36. Referring to FIG. 3, the shaft 46 rotatably attaches to the front of the cover 26, with the point 24 pivotally attaching to the crankpins 48, 50, and the partition 28 slidably attaching to the crankpins 48, 50. The crankshaft 44 functions to articulate the trailing edge 36 of the point 24 vertically relative to the surface 38 of the cover 26, while also enabling pivotal movement of the point 24 about the crankpins 48, 50. The crankshaft 44 also functions to vertically move the partition 28 along with the trailing edge 36, thus maintaining coverage of the gap 30 for the ear saver 42 function. A support 52 longitudinally extends forward from adjacent row unit 14 pairs, functioning to support the point 24, which rests on the support 52 at a midpoint 54 beneath the surface 32 of the point 24. A guide 56 attaching to the front of the cover 26 functions to constrain the partition 28 longitudinally within the gap 30. An operator may move the crankshaft 44 manually, locking it in place with a shaft lock 58, such as a spring-loaded locking pin shown in the illustrated embodiment. Alternatively, an actuator (not shown), such as an electric motor or hydraulic cylinder, may move and hold the position of the crankshaft 44 under remote control of the operator or an electronic controller.

Figure 4:
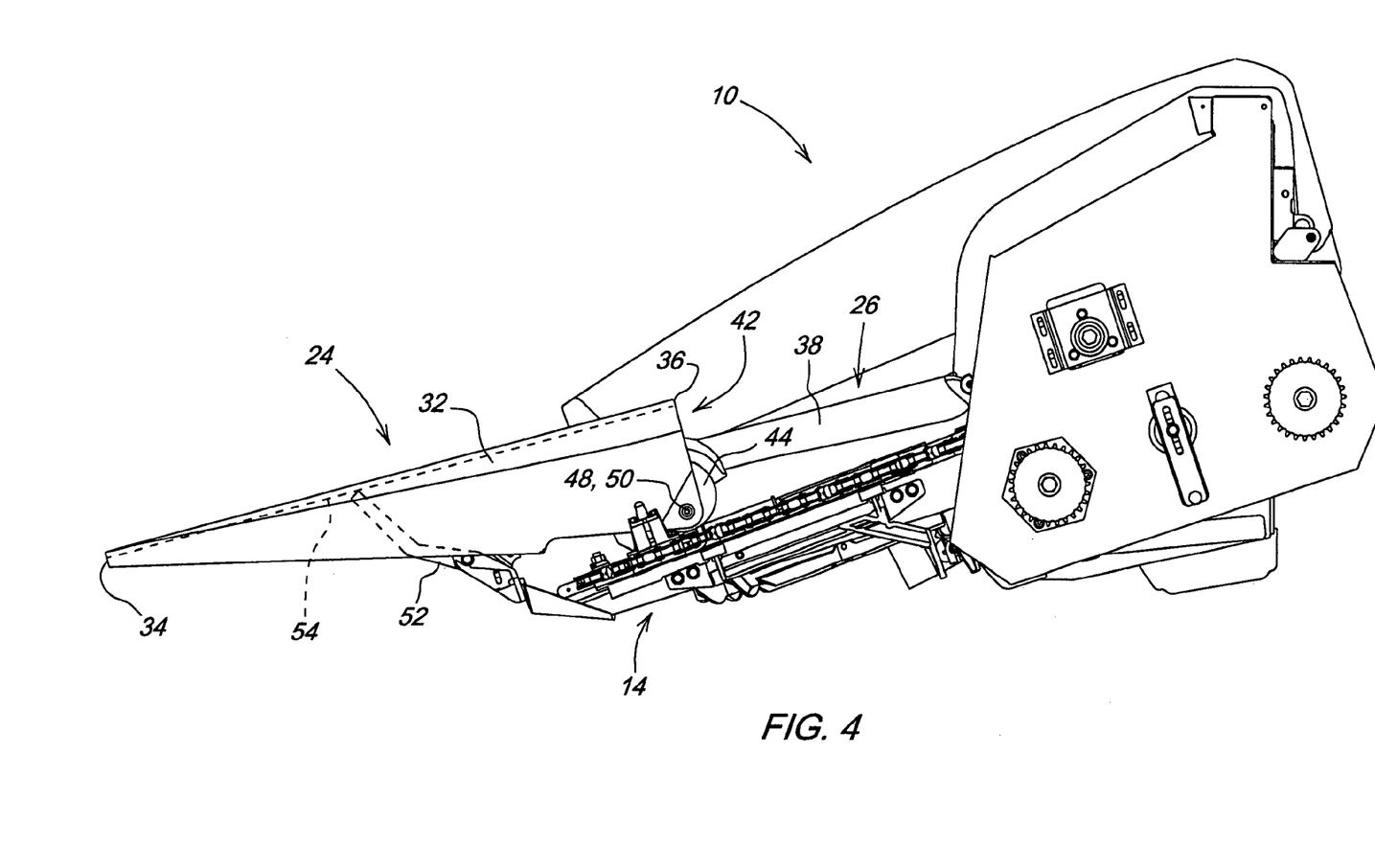
FIG. 4 is a side view of the row crop header showing the row divider with the front portion in a lowered working position.
Figure 5:
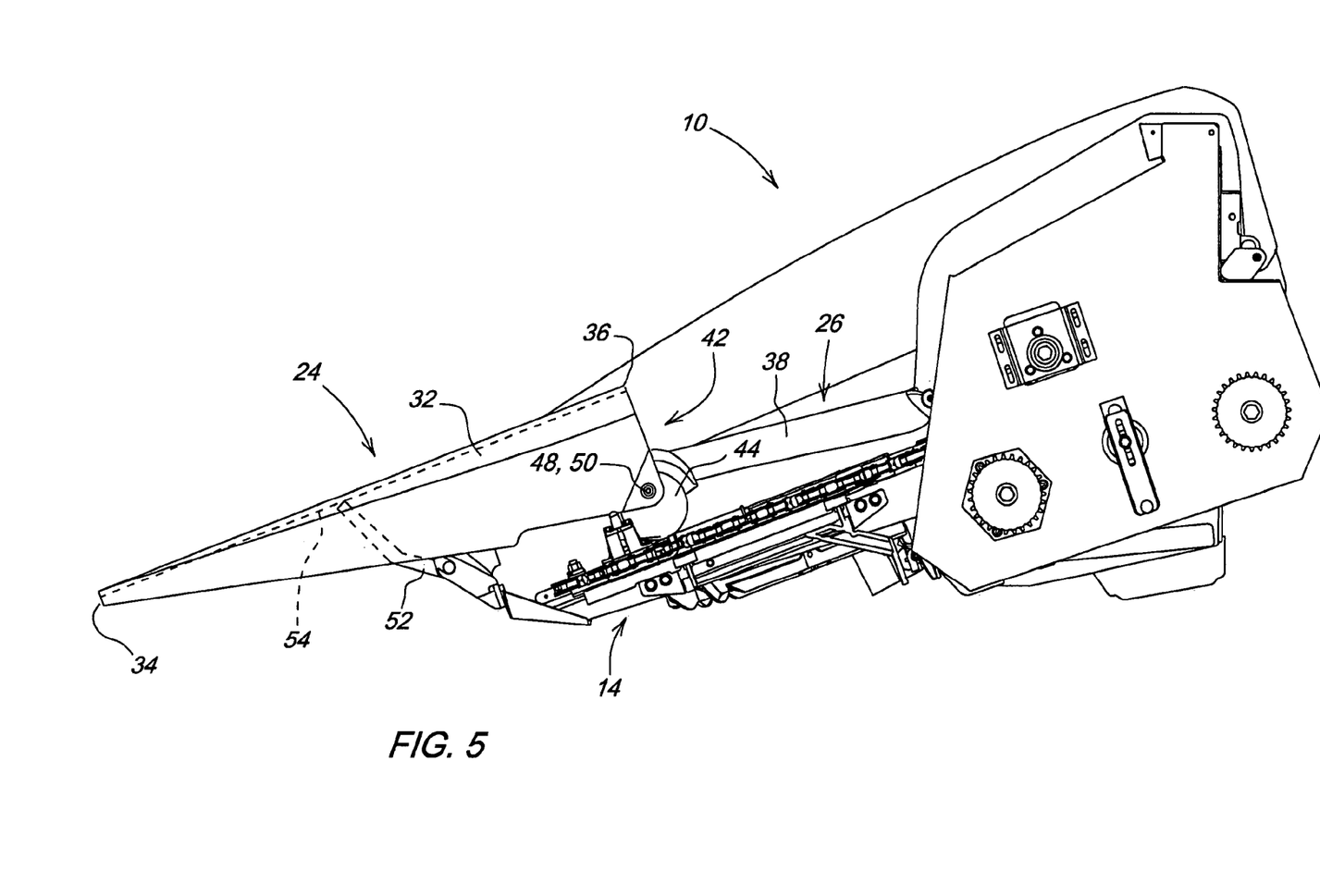
FIG. 5 is a side view of the row crop header showing the row divider with a front portion in a normal working position.

During a harvesting operation under normal conditions, the position of the crankshaft 44 is normally set to a raised position, as shown in FIG. 5, whereby the crankpins 48, 50 are oriented directly above the shaft 46. The raised crankshaft 44 position results in a raised trailing edge 36 position and a maximum gap 30 between the trailing end 36 and the surface 38 of the cover 26, providing for maximum ear saver 42 performance. During a harvesting operation in down corn, the crankshaft 44 may be rotated in order to lower the trailing edge 36 relative to the cover surface 38, as shown in FIG. 4, thereby reducing the angle of the point 24 relative to the horizontal, and minimizing resistance to crop material sliding over the row divider 16. The illustrated embodiment presents only one lowered crankshaft 44 position, whereby the crankpins 48,50 are oriented directly below the shaft 46. This lowered crankshaft 44 position results in a minimum gap 30 between the trailing edge 36 and the surface 38 of the cover 26. Alternatively, additional intermediate crankshaft 44 positions may be provided for. Furthermore, the use of an actuator may enable an infinite number of intermediate crankshaft 44 positions.

Having described the preferred embodiment, it will become apparent that various modifications can be made without departing from the scope of the invention as defined in the accompanying claims.

The invention claimed is:

1. A row divider for an agricultural harvester header, the row divider comprising:
   a front portion for guiding crop material into the header, the front portion having a tapered surface longitudinally sweeping rearward from a forward location to an upwardly arching trailing edge, the front portion trailing edge having a normal working position, and one or more lowered working positions;
   a rear portion for covering a part of the header, the rear portion having a surface longitudinally sweeping rearward from beneath the front portion trailing edge;
   a partition for retaining crop material upon the header, the partition having a planar surface substantially extending vertically and laterally between the front portion surface and the rear portion surface when the front portion trailing edge is in the normal working position;
   a support for vertically supporting the front portion; and
   a crankshaft for vertically moving and pivotally attaching the front portion to the header, the crankshaft having a laterally extending shaft rotatable relative to the rear portion, and having one or more offset crankpins rotatably attaching to the front portion proximate to the trailing edge.

2. The row divider described in claim 1 further comprising a shaft lock for selectively securing the crankshaft in a desired working position.

3. The row divider described in claim 1 further comprising:
   a guide for longitudinally restraining the partition; and
   the crankshaft for vertically moving and attaching the partition to the header, with one or more offset crankpins slidably attaching to the partition.

4. The row divider described in claim 3 further comprising a shaft lock for selectively securing the crankshaft in a desired working position.

5. A row divider for an agricultural harvester header, the row divider comprising:
   a front portion for guiding crop material into the header, the front portion having a tapered surface longitudinally sweeping rearward from a forward location to an upwardly arching trailing edge, the front portion trailing edge having a normal working position, and one or more lowered working positions;
   a rear portion for covering a part of the header, the rear portion having a surface longitudinally sweeping rearward from beneath the front portion trailing edge;
   a partition for retaining crop material upon the header, the partition having a planar surface substantially extending vertically and laterally between the front portion surface and the rear portion surface;
   a support for vertically supporting the front portion;
   a guide for longitudinally restraining the partition; and
   a crankshaft for vertically moving and pivotally attaching the front portion to the header, and for vertically moving and attaching the partition to the header, the crankshaft having a laterally extending centerline rotatable relative to the rear portion, and having one or more offset crankpins rotatably attaching to the front portion proximate to the trailing edge, and slidably attaching to the partition.

6. The row divider described in claim 5 further comprising a shaft lock for selectively securing the crankshaft in a desired working position.

7. A header for an agricultural harvester, the header comprising:
   a frame for supporting the header;
   two or more row units for cutting crop material, each row unit having a structure longitudinally extending forward from the frame; and
   one or more row dividers, each row divider having a structure longitudinally extending above portions of two adjacent row units, each row divider comprising:
       a front portion for guiding crop material into the header, the front portion having a tapered surface longitudinally sweeping rearward from a forward location to an upwardly arching trailing edge, the front portion trailing edge having a normal working position, and one or more lowered working positions;
       a rear portion for covering a part of the header, the rear portion having a surface longitudinally sweeping rearward from beneath the front portion trailing edge;
       a partition for retaining crop material upon the header, the partition having a planar surface substantially extending vertically and laterally between the front portion surface and the rear portion surface;
       a support for vertically supporting the front portion; and a crankshaft for vertically moving and pivotally attaching the front portion to the header, the crankshaft having a laterally extending centerline rotatable relative to the rear portion, and having one or more offset crankpins rotatably attaching to the front portion proximate to the trailing edge.

8. The header described in claim 7 further comprising a shaft lock for selectively securing the crankshaft in a desired working position.

9. The header described in claim 7 further comprising:
a guide for longitudinally restraining the partition; and
the crankshaft for vertically moving and attaching the partition to the header, with one or more offset crankpins slidably attaching to the partition.

10. The header described in claim 9 further comprising a shaft lock for selectively securing the crankshaft in a desired working position.

11. A header for an agricultural harvester, the header comprising:
a frame for supporting the header;
two or more row units for cutting crop material, each row unit having a structure longitudinally extending forward from the frame; and
one or more row dividers, each row divider having a structure longitudinally extending above portions of two adjacent row units, each row divider comprising:
a front portion for guiding crop material into the header, the front portion having a tapered surface longitudinally sweeping rearward from a forward location to an upwardly arching trailing edge, the front portion trailing edge having a normal working position, and one or more lowered working positions;
a rear portion for covering a part of the header, the rear portion having a surface longitudinally sweeping rearward from beneath the front portion trailing edge;
a partition for retaining crop material upon the header, the partition having a planar surface substantially extending vertically and laterally between the front portion surface and the rear portion surface;
a support for vertically supporting the front portion;
a guide for longitudinally restraining the partition; and
a crankshaft for vertically moving and pivotally attaching the front portion to the header, and for vertically moving and attaching the partition to the header, the crankshaft having a laterally extending centerline rotatable relative to the rear portion, and having one or more offset crankpins rotatably attaching to the front portion proximate to the trailing edge, and slidably attaching to the partition.

12. The header described in claim 11 further comprising a shaft lock for selectively securing the crankshaft in a desired working position.

* * * * *